US009442023B2

(12) United States Patent
Rollin et al.

(10) Patent No.: US 9,442,023 B2
(45) Date of Patent: Sep. 13, 2016

(54) ELECTRONIC TEMPERATURE SENSOR FOR MEASURING THE JUNCTION TEMPERATURE OF AN ELECTRONIC POWER SWITCH DURING OPERATION, AND METHOD FOR MEASURING THE TEMPERATURE OF THE JUNCTION BY THIS ELECTRONIC SENSOR

(71) Applicants: TECHNOFAN, Blagnac (FR); INSTITUT NATIONAL POLYTECHNIQUE DE TOULOUSE, Toulouse (FR); CENTRE NATIONAL DE LA RECHERCHE SCIENTIFIQUE (C.N.R.S), Paris (FR)

(72) Inventors: Pascal Rollin, Daux (FR); Frederic Richardeau, Flourens (FR); Matthieu Morvan, Tournefeuille (FR); Franck Mosser, Toulouse (FR)

(73) Assignees: TECHNOFAN, Blagnac (FR); INSTITUT NATIONAL POLYTECHNIQUE DE TOULOUSE, Toulouse (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 0 days.

(21) Appl. No.: 14/769,261

(22) PCT Filed: Feb. 21, 2014

(86) PCT No.: PCT/EP2014/053474
§ 371 (c)(1),
(2) Date: Aug. 20, 2015

(87) PCT Pub. No.: WO2014/128274
PCT Pub. Date: Aug. 28, 2014

(65) Prior Publication Data
US 2015/0377717 A1 Dec. 31, 2015

(30) Foreign Application Priority Data
Feb. 22, 2013 (FR) ..................................... 13 51572

(51) Int. Cl.
*H02P 6/14* (2016.01)
*G01K 13/00* (2006.01)
(Continued)

(52) U.S. Cl.
CPC ................ *G01K 13/00* (2013.01); *G01K 7/01* (2013.01); *H02M 7/537* (2013.01); *H02P 27/06* (2013.01); *G01K 2217/00* (2013.01); *H02M 2001/327* (2013.01)

(58) Field of Classification Search
CPC .... H02M 5/293; H02M 7/217; H02M 7/537; G01K 13/00; G01K 2217/00; G01K 7/01; H02P 27/06
USPC .......... 318/400.26, 453, 472, 458, 454, 459, 318/471; 361/18, 23, 93.8, 100, 101, 103
See application file for complete search history.

(56) References Cited

U.S. PATENT DOCUMENTS 5,608,595 A * 3/1997 Gourab .............. H03K 17/0826
361/101
5,828,539 A * 10/1998 Bijlenga .............. H03K 17/163
361/100
(Continued)

FOREIGN PATENT DOCUMENTS

DE 103 51 843 A1 6/2005
DE 10 2010 000875 A1 7/2011
JP 2001 085629 A 6/2001

OTHER PUBLICATIONS

International Search Report, dated Sep. 4, 2014, from corresponding PCT application.
(Continued)

*Primary Examiner* — Bentsu Ro
*Assistant Examiner* — Thai Dinh
(74) *Attorney, Agent, or Firm* — Young & Thompson

(57) ABSTRACT

An electronic temperature sensor for measuring the junction temperature of an electronic power switch (4) of a static converter (8) includes an injection source of a calibrated measurement current (20) and a differential voltage measurement amplifier (76; 276). The electronic temperature sensor includes a first series connection (26) element and a second series connection (28) connected respectively to the inlet terminals (78, 80) of the differential voltage amplifier (76; 276). The first and second series connection elements (26, 28; 224, 226) are configured to protect the amplifier against a high voltage, have essentially identical electrical characteristics and are included in the set formed by resistances and high-voltage (HV) rapid diodes.

10 Claims, 8 Drawing Sheets

(51) Int. Cl.
*G01K 7/01* (2006.01)
*H02M 7/537* (2006.01)
*H02P 27/06* (2006.01)
*H02M 1/32* (2007.01)

(56) References Cited

U.S. PATENT DOCUMENTS

| | | | |
|---|---|---|---|
| 5,898,554 A * | 4/1999 | Schnetzka | H03K 17/0828 323/276 |
| 6,060,792 A | 5/2000 | Pelly | |
| 7,859,213 B2 * | 12/2010 | Serizawa | F01P 7/08 318/452 |
| 8,243,407 B2 * | 8/2012 | Fukami | H03K 17/0822 361/78 |
| 2006/0018074 A1 | 1/2006 | Inoue et al. | |

OTHER PUBLICATIONS

FR Search Report, dated Dec. 3, 2013, from corresponding FR application.

* cited by examiner

ELECTRONIC TEMPERATURE SENSOR FOR MEASURING THE JUNCTION TEMPERATURE OF AN ELECTRONIC POWER SWITCH DURING OPERATION, AND METHOD FOR MEASURING THE TEMPERATURE OF THE JUNCTION BY THIS ELECTRONIC SENSOR

FIELD OF THE INVENTION

The present invention relates to an electronic temperature sensor designed to measure the junction temperature of an electronic power switch during operation and a method for measuring the temperature of the junction using the electronic sensor with a short response time.

Direct temperature measurements of controlled electronic switches, integrated into static converters, themselves integrated into electrical power systems, are delicate because they are very intrusive due to the small size of those encapsulated components involving high voltages.

BACKGROUND OF THE INVENTION

The use of thermocouple or heat-sensitive sensors in general as temperature sensors in such electrical systems is known.

However, although operational solutions exist for the electrical isolation of these thermocouple, electrically conductive sensors, the response time for this type of temperature sensor, i.e., the time resolution of thermocouple sensors, remains at around ten milliseconds, which restricts the use of thermocouples to thermal equilibrium conditions.

Heat radiation detectors, for example infrared radiation-sensitive cameras, offset this drawback, since they have faster response times and can measure temperature variations with a time resolution below 1 ms.

However, these heat radiation detectors require a field of view on the measured object with no concealed portions, which is not ordinarily possible on power modules. Indeed, the traditional encapsulation techniques do not generally make it possible to have unhindered visibility of the module, and this type of detector cannot be integrated into a component housing.

One solution making it possible to offset the drawbacks described above lies in the principle of using the power chip itself as the electronic temperature sensor, such that the temperature measurement can be done with calibrated series modules without damaging the encapsulation.

In principle, any electrical parameter depending on the temperature of a power chip, i.e., a controlled electronic switch such as an IGBT (Inverse Gate Bipolar Transistor), can be used for electronic measurement of the junction temperature.

The use of the evolution as a function of the temperature of the voltage drop of the semiconductor junction in direct conduction, measured between the two main power electrodes (anode-cathode or drain-source or collector-emitter) of the electronic switch, for example a silicon junction (in case of a bipolar component) or an ohmic region (case of a field effect component), is of the utmost interest, since it takes advantage of a temperature response that is most often substantially linear over a wide temperature band.

For the bipolar components, the exploitation of the evolution as a function of the temperature, denoted T, of the diffusion voltage VCE(T) with a low current is known to determine the temperature of a semiconductor junction without needing an additional direct temperature sensor. It is for example described in the article by Scheuermann et al., entitled "Investigations on the VCE(T)—Method to determine the junction temperature by using the chip itself as sensor" published in Proceedings PCIM Europe 2009 Conference, pages 802 to 807.

For example, the slope of the temperature characteristic of the diffusion voltage is approximately −2 mV/K for an injection measurement current of 200 mA injected into the current IGBT chips.

In order to have good precision of the junction temperature, it is necessary to find the right compromise regarding the choice of the measurement current, which must not cause an ohmic voltage drop and auto-heating of the chip, which must be sufficient to preserve good immunity to parasites.

One of the difficulties of this indirect electronic temperature measurement technique lies in the precise and quick measurement of a small voltage drop across the terminals of a controlled electronic switch, for example across the terminals of an IGBT, working in nominal service in a switching cell with a high voltage, for example several tens or hundreds of volts, with switched currents of at least several amperes, or even several hundreds of amperes.

A first embodiment of an electronic temperature sensor implementing the VCE(T) technique is described in the article by Amgad RASHED et al., entitled "Automatic characterization of IGBT modules placed in an aging process by heat cycling" and presented to the Congrès d'électronique de puissance du future conference, Bordeaux 2012.

The electronic temperature sensor described in this article, and associated itself with an IGBT switch of a switching cell of a two-phase inverter, includes a VCE measuring circuit connected across the power terminals of the IGBT transistor and an injection current source for a measuring current of 100 mA, made in the form of a simple ballast resistance, therefore depending on the supply voltage.

The VCE measuring circuit is made up of a voltage clipper to limit the voltage experienced by the measuring circuit when the tested transistor is blocked, and a voltage-current converter.

A second embodiment of an electronic temperature sensor implementing the VCE(T) technique is disclosed in the article by D. Bergogne et al. entitled "An estimation method of the channel temperature of power MOS devices" published in Power Electronics Specialists Conference, 2000, PESC 00, 2000 IEEE 31st, vol. 3, pp. 1594-1599.

The technical problem is to simplify the structure of the electronic temperature sensor, in particular the VCE measurement circuit, in terms of lack of high-voltage active components, and to make the structure independent of the supply voltage level.

One related technical problem is to improve the reliability of the electronic temperature sensor.

SUMMARY OF THE INVENTION

To that end, the invention relates to an electronic temperature sensor for measuring the junction temperature of a controlled electronic power switch of an electronic switching cell of a static converter, comprising:
  an injection source of a calibrated measurement current and a differential voltage measurement amplifier,
  the injection source of a calibrated measurement current having at least one injection and output terminal and being configured to deliver a first calibrated measurement output current at a first injection and output terminal from among the at least one output terminal, the first output terminal being designed to be connected to an upstream power terminal of the junction of the electronic switch whose temperature is being measured, the differential voltage amplifier having a first differential amplifier input terminal and a second differential amplifier input terminal for a differential voltage signal, a first series connection element for protecting against a high voltage having a first, first element terminal connected to the first differential input terminal of the differential voltage amplifier and a second first element terminal connected to the upstream power terminal of the semiconductor junction of the electronic switch whose temperature is measured, a second series connection element protecting against a high voltage, having a third second element terminal connected to the second differential input terminal of the differential voltage amplifier, and a fourth second element terminal connected to the downstream power terminal of the semiconductor junction of the electronic switch whose temperature is being measured, the first and second series connection elements having essentially identical electrical characteristics and being comprised in the set formed by resistances and high-voltage rapid diodes.

According to specific embodiments, the electronic temperature sensor includes one or more of the following features:

the first series connection element is a first high-voltage isolating rapid diode, connected by its anode through the first terminal of a first element to the first differential input terminal of the differential voltage amplifier, the second series connection element is a second high-voltage insulating rapid diode, connected by its anode through the third second element terminal to the second differential input terminal of the differential voltage amplifier, and the injection source is configured to deliver a second calibrated correction current at a second injection and output terminal, the second injection and output terminal being connected to the downstream power terminal of the junction of the electronic switch whose temperature is being measured, and the injection source is configured to adjust the first and second rapid isolating diodes to a same current value, such that the voltage drops across the terminals of the first and second diodes are identical;

the first high-voltage rapid isolating diode is connected by its cathode through the second first element terminal to the first injection and output terminal while being part of the injection source to isolate and protect the injection source in high voltage;

the second high-voltage isolating rapid diode is connected by its cathode through the fourth second element terminal to the second injection and output terminal while being part of the injection source to isolate and protect the injection source in high voltage;

the sensor includes a first low-voltage clipper diode and a second low-voltage clipper diode respectively connected by a first clipper diode anode and a second clipper anode to the first differential input and the second differential input of the differential voltage amplifier to protect the differential voltage amplifier in voltage, and wherein the injection source has a single first injection and output diode to deliver the calibrated measurement current in the upstream power terminal of the junction of the electronic switch, and includes a high-voltage rapid protection diode, the protection diode being separate from the first series connection element and the second series connection element, and being connected by its cathode to the first injection and output terminal, the first series connection element and the second series connection element are two first and second electric resistances respectively connected in parallel to the first and second clipper diodes to protect the clipper diodes in current and the differential voltage amplifier, the first and second electric resistances having substantially the same resistance value; and the injection source includes a controlled switch for inhibiting the injection of the first calibrated measurement current to reduce the consumption of the sensor when the temperature measurement is not done.

The invention also relates to a static converter comprising a set of controlled electronic switches and an electronic temperature sensor as defined above, the electronic sensor being associated itself with and connected to a single controlled electronic switch of the assembly, wherein the electronic switch includes a semiconductor power junction that has a low impedance when the switch is commanded in an on state and a high impedance when the switch is commanded in an on state, and the electronic switch includes an upstream power collector terminal C and a downstream power emitting terminal E of said semiconductor junction of the electronic switch whose temperature is being measured, the first injection and output terminal of the injection source is connected to the upstream power collector terminal of the junction, the second first element terminal is connected to the upstream collector terminal C of the junction, and the fourth second element terminal is connected to the downstream emitting terminal E of the junction.

The invention also relates to an electric power system comprising an electric supply bus, a static power converter, as defined above, and supplied by the electric supply bus, and an electric charge supplied by the static converter at the output of the converter, the static converter comprising a set of an integer number of distinct switching cells arranged in a predetermined structure and powered by the electric supply bus, and each switching cell being formed by an associated pair of controlled electronic switches.

According to specific embodiments, the electric system includes one or more of the following features:

the electric power bus is a DC voltage current source, the static converter is a polyphase inverter with a number p of phases, connected at the input and powered by the electric supply bus, the number p of phases being greater than or equal to 2, and the charge supplied by and connected to the polyphase static converter being a synchronous or asynchronous motor having the same number of phases p as the static converter.

The invention also relates to a method for implementing the electronic temperature sensor as defined above, comprising the following steps:

in a first step, preparing the temperature measurement of the power junction of the tested switch, by commanding the switch to measure the temperature, in the open state in the on state, and blocking the remaining switches so as to cancel or minimize the parasitic currents generated by the possible parasitic current sources that may cross through the power junction of the temperature-tested switch placed in the on state, and to synchronize the injection of the measurement current over a particular control sequence of the switches, then in a second step, from a first moment t1 for receiving a command to begin the injection of a calibrated measurement current conditioned by the detection of the cancellation of the current having crossed through the tested switch, closing, through a command, the temperature-tested switch to reestablish the low-impedance conduction state of the power junction whose actual temperature is sought, the parasitic currents generated by the motor voltages being able to cross through the power junction of the tested switch being kept minimal or negligible, and for a first predetermined duration $\Delta t1$, injecting a calibrated measurement current via the injection source into the semiconductor junction of the electronic switch tested and placed in the closed state, and in a third step, from a second moment t2, beginning the measurement by the measurement chain, after and separated from the first moment t1 by a second duration $\Delta t2$ shorter than the first duration $\Delta t1$, measuring the evolution of the voltage VCE(T) measured across the terminals of the semiconductor junction of the switch tested by the differential voltage amplifier during a third duration $\Delta t3$ shorter than the difference between $\Delta t1$ and $\Delta t2$, then in a fourth step, following the third step, deducing the temperature $\Delta T$ of the junction $\Delta$ from the evolution of the measured voltage $\Delta VCE(T)$ and a predetermined characteristic conversion curve between the voltage VCE and the predetermined temperature.

BRIEF DESCRIPTION OF THE DRAWINGS

The invention will be better understood upon reading the following description of several embodiments, provided solely as an example, and done in reference to the appended drawings, in which.

DETAILED DESCRIPTION OF THE INVENTION

Figure 1:
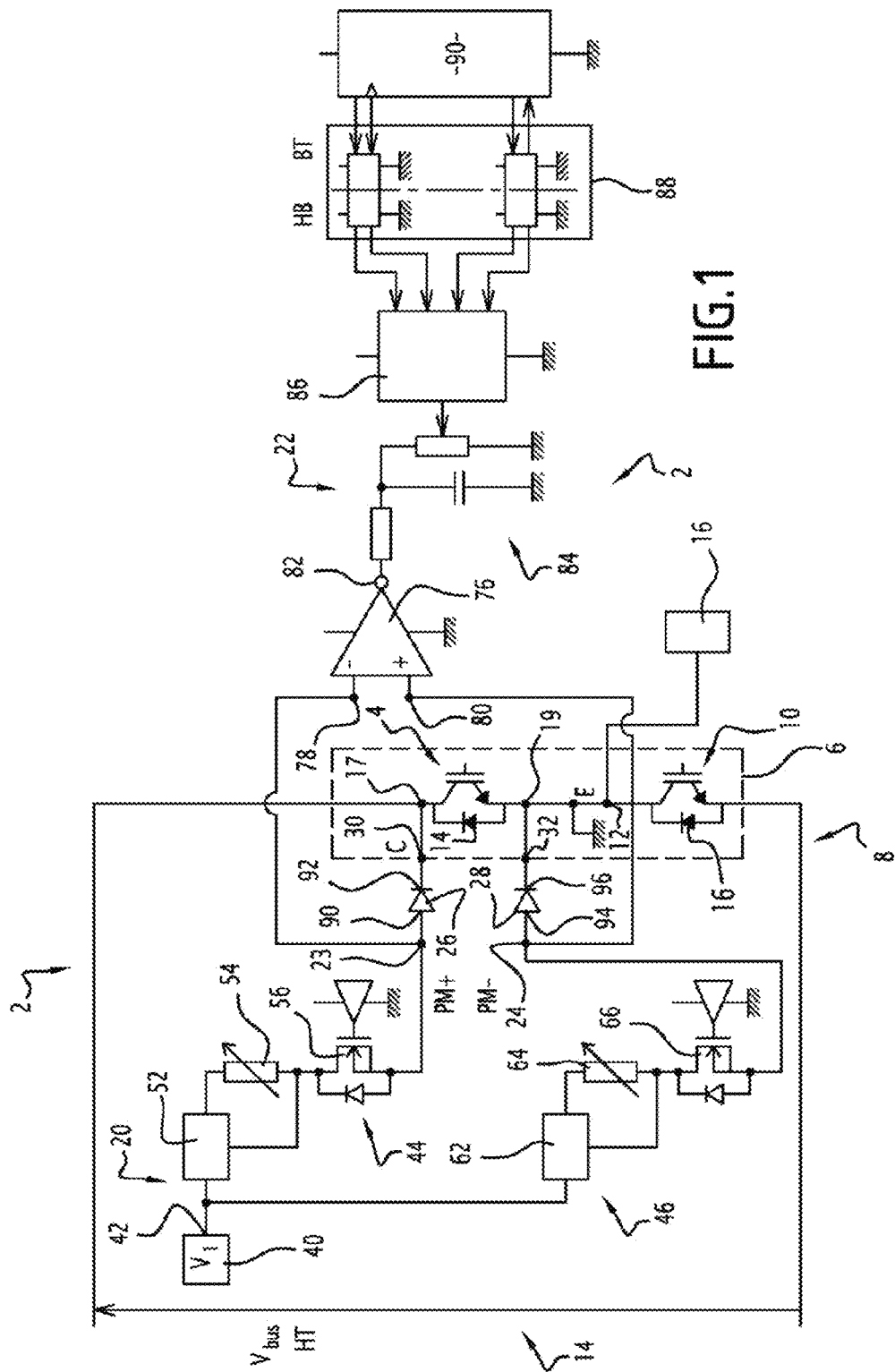
FIG. 1 is a view of a first embodiment of an electronic sensor for measuring the temperature according to the invention at a current injection source, installed in a static power converter with any structure.

According to FIG. 1, an electronic temperature sensor 2 according to the invention is configured to measure and monitor the junction temperature of a controlled electronic power switch 4 of an electronic switching cell 6 of a static converter 8.

Here, a single switching cell 6 is shown, the static converter being able to have several.

The switching cell 6 comprises, as first switch, the electronic power switch 4, and a second controlled electronic switch 10, the first and second controlled electronic switches 4, 10 being connected to one another in series by a midpoint 12.

The first and second switches 4, 10 each comprise a unique and different free-wheeling diode 14, 16 mounted in antiparallel.

The series circuit 6 thus formed is connected between a voltage source or bus, here the source 14 shown by the voltage Vbus, and connected to a current source 16 forming a charge through the midpoint 12.

The first and second electronic switches 4, 10 are a priori any switches in terms of technology and control. The first and second switches 4, 10 of the switching cell 6 cannot be closed simultaneously, i.e., conductive at the same time, failing which they may short-circuit the voltage source.

Here, the first electronic switch 4 whose temperature is measured is a transistor of the IGBT type that comprises a first upstream terminal 17 here forming an anode and a second downstream terminal 19 here forming a cathode respectively corresponding to the terminal, designated C in FIG. 1, collecting power, and at the terminal, designated E in FIG. 1, emitting power of the semi-conductive junction of the IGBT power transistor 4.

The electronic sensor 2 is dedicated exclusively to measuring the temperature of the first controlled electronic power switch 4.

The electronic sensor 2 comprises an injection source 20 for a calibrated measurement current, an electronic measurement chain 22 for measuring the temperature of the junction with differential inputs 23, 24, a first series connection element 26 and a second series connection element 28, which are respectively connected in series between the first upstream terminal 17 and the first differential input 23, and between the second downstream terminal 19 and the second differential input 24, and configured to protect the electronic measurement chain 22 when high voltage is applied by the DC bus 14.

The injection source 20 of a calibrated measurement current includes a first output terminal 30 and a second output terminal 32.

The injection source 20 of a calibrated measurement current is configured to deliver a first calibrated measurement injection current at the first injection and output terminal 30, the first injection and output terminal 30 being connected to the upstream terminal 16 collecting power C of the junction of the IGBT switch 4 whose temperature is being measured. The first calibrated measurement current is the actual current crossing through the semi-conductive junction of the controlled electronic switch 4 when the switch is closed and the electronic sensor implements the temperature measurement.

The injection source 20 for a calibrated measurement current is also configured to deliver a second calibrated correction current to the second output terminal 32, the second output terminal 32 being connected to the downstream terminal 18 emitting power E of the junction of the first switch 4 whose temperature is measured.

The injection source 20 for a calibrated measurement current is protected in high voltage HV, here by the first and second series connection elements 26, 28.

Here, the injection source 20 comprises a supply voltage source 40 having an output terminal 42, a first channel 44 for developing and delivering the first calibrated measurement current at the first injection output terminal 30, and a second channel 46 for developing and delivering the second calibrated correction current at the second output terminal 30.

The first channel 44 comprises, connected in the described order and in series from the output terminal 42 of the voltage source 40 to the first injection and output terminal 30 of the injection source 20, a first current regulator 52, a first adjusting element 54 for the regulated output current of the first regulator, a first controlled switch 56 for inhibiting the injection of the first measurement current and the first series connection element 26 to reduce the consumption of the sensor when the temperature measurement is not done.

The second channel 46 comprises, connected in the described order and in series from the output terminal 42 of the voltage source 40 to the second injection and output terminal 32 of the injection source 20, a second current regulator 62, a second adjusting element 64 of the regulated output current of the same regulator 62, a second control switch 66 for inhibiting the injection of the first measurement current, and the second series connection element 28 to reduce the consumption of the sensor when the temperature measurement is not being done.

The first and second adjusting elements 54, 64, here adjustable resistances, are adjusted such that the calibrated measurement current supplied by the first channel 44 and the correction current supplied by the second channel 46 is substantially equal, or equal. Here for example, the value of the calibrated measurement current is considered to be equal to 200 mA for the type of IGBT transistor used.

The electronic measurement chain 22 comprises the first differential input terminal 23 and the second differential input terminal 24, respectively connected to the upstream terminal 17 collecting power C and the downstream terminal 19 emitting power E of the junction of the switch 4 whose temperature is being measured through the first series connection element 26 and the second series connection element 28.

The electronic measurement chain 22 includes a differential voltage amplifier 76, having a first differential input terminal 78 and a second differential input terminal 80 of a differential voltage signal and an output terminal 82, and includes, connected in the described order and in series from the output terminal 82, an adaptation stage 84 to an analog/digital converter, an analog/digital converter 86, an acquisition and transmission unit 88 with galvanic isolation of the digital signal sampled by the analog/digital converter 86, and a digital processing unit 90.

The first series connection element 26 here is a first high-voltage (HV) rapid diode that isolates and protects, in high voltage, the differential voltage amplifier 76, when the high voltage of the DC bus is applied to the electronics of the sensor.

The first high-voltage rapid diode 26 has, in its anode, a first terminal 90 of the first element is connected to the first input terminal of the differential voltage amplifier 76, and here is part of the measurement current source 20.

The first high-voltage rapid diode 26 has, in its cathode, a second terminal 92 of the first element that is connected to the upstream terminal 17 collecting power C of the semi-conductor junction of the switch.

The second series connection element 28 here is a second high-voltage (HV) rapid diode that isolates and protects, in high voltage, the differential voltage amplifier 76 when the high voltage of the DC bus is applied to the electronics of the sensor.

The second high-voltage rapid diode 28 has, in its anode, a third terminal 94 of a second element that is connected to the second input terminal 80 of the differential voltage amplifier 76 and here is part of the measurement current source 20.

The second high-voltage rapid diode 28 has, in its cathode, a fourth terminal 96 of a second element, that here is connected to the downstream terminal 19 emitting power E of the junction of the control switch 4.

The first and second high-voltage rapid diodes 24, 26 are selected and matched using the criterion that they have essentially identical electrical characteristics as a function of the temperature.

For example, the diodes 24, 26 are chosen in a same section and same manufacturing lot.

Preferably, the diodes 24, 26 are installed on adjacent locations of a same substrate and have the same temperature.

With such a sensor structure, the calibrated measurement current injected at the upstream terminal 17 of the junction of the switch 4 is the actual measurement current crossing through the junction of the switch 4 whose structure is being measured.

Likewise, the differential voltage taken across the terminals of the gain amplifier is the actual differential voltage VCE presented to the terminals of the power junction of the switch 4 whose temperature is being measured when the calibrated measurement current crosses through the junction of the switch 4.

In fact, the differential voltage taken across the terminals of the gain amplifier is denoted and equal to $V_{PM+}-V_{PM-}$, and verifies the following relationship:

$$V_{PM+}-V_{PM-}=V_{D1}+V_{CE}-V_{D2}$$

wherein $V_{D1}$ designates the voltage drop of the first diode 24 and $V_{D2}$ designates the voltage drop of the second diode 26 when the first and second diodes 24, 26 are respectively crossed through by the measurement current and the correction current derived from the same source and calibrated to the same value, Which yields:

$$V_{PM+}-V_{PM-}\approx V_{CE}$$

Since the diodes have identical electrical characteristics, they are subject to the same temperature fluctuations and supplied at their input by substantially identical and correlated currents.

Thus, the intrinsic measuring noise generated by the diodes is decreased and sensitivity of the measurement is increased.

Furthermore, this structure is simpler and more reliable, since the high-voltage rapid diodes are simple dipolar passive components.

Advantageously, the inhibition switches make it possible to save electricity by deactivating the injection source of the measurement current during the nominal operating periods of the switch 4 outside measuring periods.

Figure 2:
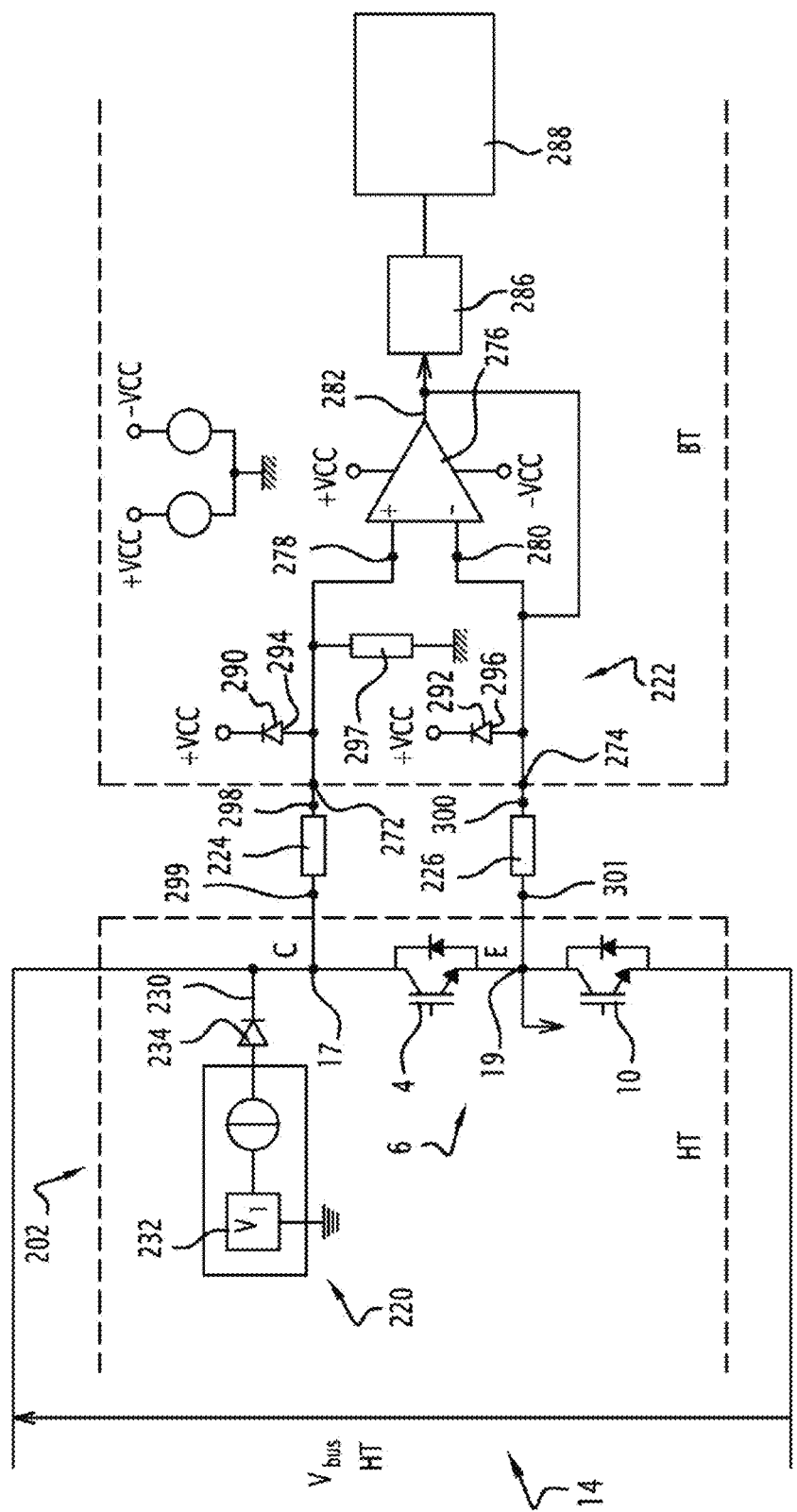
FIG. 2 is a view of a second embodiment of an electronic sensor for measuring the temperature according to the invention at an injection source for a single current installed in a static power converter having any structure.

According to FIG. 2, a second embodiment of an electronic temperature sensor 202 according to the invention is configured to measure and monitor the junction temperature of the same controlled electronic switch 4 shown in FIG. 1.

Like FIG. 1, the same switching cell 6 is shown and comprises the same first controlled electronic power switch 4 and the same second controlled electronic power switch 10, the first and second electronic switches 4, 10 being connected in series at the same midpoint 14 as that described in FIG. 1.

The electronic temperature sensor 202 comprises an injection source 220 for injecting a calibrated measurement current, an electronic measurement chain 222 for measuring the temperature of the junction, a first series connection element 224 and a second series connection element 226 to protect the electronic measurement chain 222 from a high voltage.

The injection source 220 for a calibrated measurement current includes a single injection and output terminal 230 to inject the calibrated measurement current into the upstream terminal 17 collecting power C of the junction.

The injection source 220 for a calibrated measurement current is a current generator including a voltage source 232 followed by a voltage/current converter 234 having a current regulation.

The injection source 220, like the current injection source 20 of FIG. 1, is configured to deliver a calibrated output measurement current at the injection and output terminal 230, the output terminal 230 being connected to the upstream terminal 17 collecting power C of the junction of the controlled switch 4 whose temperature is intended to be measured. The calibrated measurement current is substantially equal to the actual current crossing through the semiconductor junction of the controlled electronic switch 4 when the switch 4 is closed and the electronic sensor 220 implements the temperature measurement.

Unlike the current injection source 20 of FIG. 1, the injection source 220 does not include a second injection and output terminal to deliver a calibrated correction current.

The injection source 220 for a calibrated measurement current includes a high-voltage rapid protection diode 234, connected by its cathode to the injection and injection output terminal 230 to protect the injection source 220 against the application of the high voltage from the DC bus to the electronics of the injection source.

The electronic measurement chain 222 comprises a first differential input terminal 272 and a second differential input terminal 274, respectively connected through the first series connection element 224 and the second series connection element 226 to the upstream terminal 17 collecting power C and the downstream terminal 19 emitting power E of the junction of the controlled switch 4 whose temperature is measured.

The electronic measurement chain 222 includes a differential voltage amplifier 276, having a first differential input terminal 278 and a second differential input terminal 280 of a differential voltage signal and an output terminal 282, and includes, connected in the described order and in series from the output terminal 282, an analog/digital converter 286 and a digital processing unit 288.

The electronic measurement chain also comprises a first low-voltage clipper diode 290 and a second low-voltage clipper diode 292, which are respectively connected by a first clipper diode anode 294 and a second clipper diode anode 296 to the first differential input 278 and the second differential input 280 of the differential amplifier 276 to protect the differential amplifier in terms of voltage.

The first series connection element 224 here is a first current-limiting resistance with a value equal to K times R ohms, with K being an integer greater than 10 and R being a value expressed in ohms of an input resistance 297 of the differential voltage amplifier 276.

The first current-limiting resistance 224 has a first terminal 298 of a first element, connected to the first input terminal 278 of the differential voltage amplifier 276 and the anode of the first clipper diode 290, and a second first element terminal 299, connected to the upstream terminal 17 for collecting power C of the semiconductor junction of the control switch 4.

The first series connection element 224 in combination with the first clipper diode 290 makes it possible to isolate the differential amplifier 276 from the high voltage of the DC bus. The first resistance 224 acts as a ballast resistance by limiting the current when the high-voltage bus is applied, which makes it possible to protect, in terms of current, the first clipper diode 290 connected in parallel from the differential amplifier 276 at the first differential input 278.

Here, the second series connection element 226 is a second current-limiting resistance, with the same value K.R as that of the first current-limiting resistance 224.

The second current-limiting resistance 226 includes a third second element terminal 300, connected to the second input terminal 280 of the differential voltage amplifier 276 and the anode of the second clipper diode, and a fourth second element terminal 301, connected to the downstream terminal 19 emitting power E of the junction of the control switch 4.

The second series connection element 226 in combination with the second clipper diode 292 makes it possible to isolate the differential amplifier 276 from the high voltage of the DC bus. The second resistance 226 acts as a ballast resistance by limiting the current when the high-voltage bus is applied, which makes it possible to protect, in terms of current, the second clipper diode 292 connected in parallel from the differential amplifier 276 at the second differential input 280.

The first and second current-limiting resistances 224, 226 are selected and matched based on the criterion that they have essentially identical electrical characteristics as a function of the temperature.

For example, the limiting resistances are chosen in a same section and same manufacturing lot.

In general, an electronic temperature sensor according to the invention is configured to measure and monitor the junction temperature of an electronic power switch of an electronic switching cell of a static converter.

The electronic sensor comprises an injection source for a calibrated measurement current and a differential voltage amplifier.

The injection source for a calibrated measurement current includes at least one injection and output terminal and is configured to deliver a first calibrated measurement current at the output at a first injection and output terminal from among the at least one injection and output terminal, the first injection and output terminal being designed to be connected to an upstream power terminal of the junction of the electronic switch whose temperature is being measured.

The injection source for a calibrated measurement current is protected against the injection, at its first output terminal, of a possible power current.

The differential voltage amplifier includes a first differential amplifier input terminal and a second differential amplifier input terminal of a differential voltage signal.

The differential voltage amplifier does not support a high electric power in terms of electric current level injected at the input.

The electronic temperature sensor comprises a first series connection element and a second series connection element to protect the differential voltage amplifier against a high voltage of the DC bus.

The first series connection element includes a first terminal of a first element connected to the first differential input terminal of the differential voltage amplifier and a second first element terminal connected to the upstream power terminal of the semiconductor junction whose temperature is measured.

The second series connection element includes a third terminal of a second series connection element connected to the second differential input terminal of the differential voltage amplifier and a fourth terminal of a second element connected to a downstream power terminal of the semiconductor junction whose structure is being measured.

The first and second series connection elements have essentially identical electrical characteristics and are comprised in the set formed by the resistances and the high-voltage (HV) rapid diodes.

Figure 3:
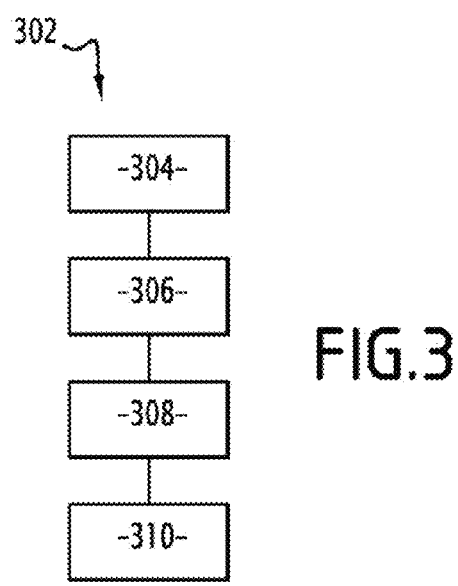
FIG. 3 is a flowchart of a method for implementing the thermal sensors of FIGS. 1 and 2.

According to the flowchart of FIG. 3, a method 302 for measuring the temperature of a semiconductor junction of a controlled electronic switch 4 is implemented by an electronic temperature sensor as defined in FIGS. 1 and 2, and comprises a set of steps 304, 306, 308 and 310.

In a first step 304 for preparing the temperature measurement of the power junction of the tested switch, the parasitic currents generated by possible parasitic current sources that may cross through the power junction of the temperature-tested switch when the switch is on have been canceled out or minimized, and the tested switch is commanded to the open state, which corresponds to a high impedance value of the power junction placed in that state. Step 304 follows a usage phase during which the electronic switch to be measured has been nominally active and has reached its maximum operating temperature.

Then, in a second step 306, from the first moment t1 for reception of a command to begin injecting a calibrated measurement current, the temperature-tested switch is closed by a command to reestablish the low impedance conduction state of the power junction whose actual temperature is sought. All of the other switches are commanded to the blocked state. The parasitic currents generated by the voltage sources of the motor that may cross through the power junction of the tested switch are kept null or minimal using a particular synchronization between the measurement sequence of the sensor and the position of the rotor of the motor (phase angle), and during a first predetermined duration $\Delta t1$, a calibrated measurement current with a low value, for example equal to 200 mA, is injected directly by the injection source into the semiconductor junction of the tested electronic switch and placed in the closed state.

In a third step 308, from a second moment t2 for the beginning of the measurement by the measurement chain, after and separated from the first moment t1 by a second duration $\Delta t2$ shorter than the first duration $\Delta t1$, the evolution of the voltage VCE(T) is measured across the terminals of the semiconductor junction of the switch tested by the differential voltage amplifier for a third duration $\Delta t3$ shorter than the difference between $\Delta t1$ and $\Delta t2$.

In a fourth step 310, following the third step 308, the differential temperature $\Delta T$ of the junction is deduced from the evolution of the measured voltage $\Delta VCE(T)$ and a predetermined characteristic conversion curve between the voltage VCE and the predetermined temperature. This curve makes it possible to extract the sensitivity coefficient. The voltage evolution is defined by the difference between the measurement of VCE hot at the temperature T and the measurement of VCE at a reference temperature Tref. The evolution of the temperature is defined by the difference between the sought temperature T and the reference temperature Tref. For example, considering a constant sensitivity factor:

$$T = Tref. I(VCE(T) - VCE(Tref))/\text{heat sensitivity factor}$$

Figure 4:
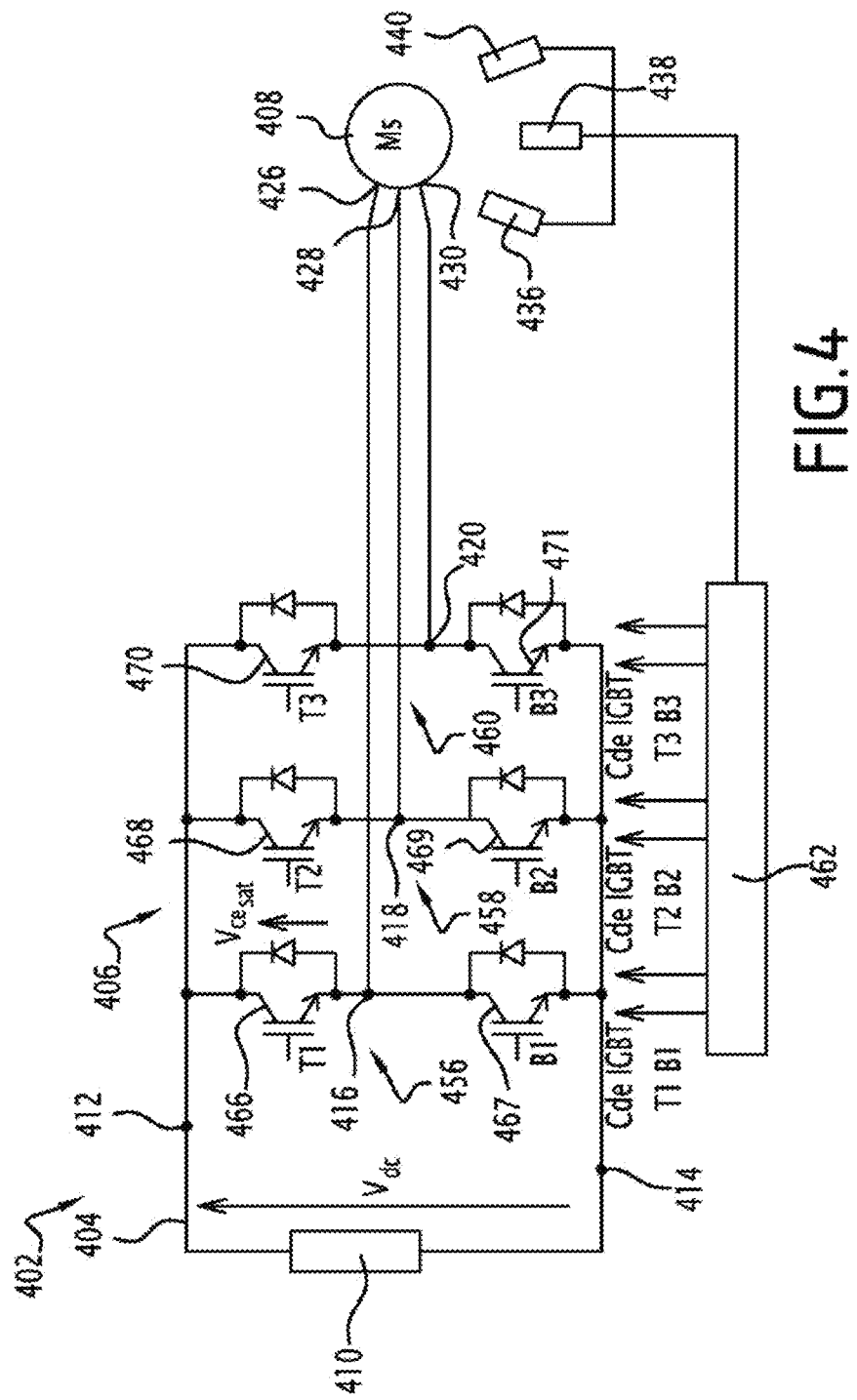
FIG. 4 is a view of the architecture of one example electrical system including a static converter, coupled to a charge and implementing at least one of the thermal sensors of FIG. 1 and/or FIG. 3.

According to FIG. 4, an electric power system 402 implementing at least one electronic temperature sensor described in FIG. 1 or FIG. 2, comprises an electric supply bus 404, a static power converter 406 powered by the electric supply bus 404, and an electric charge 408, supplied by the static converter 406.

The electric supply bus 404 is connected to a DC voltage source 410 and delivers a DC voltage designated Vdc to the static converter 406.

The static converter 406 here is a three-phase inverter having two input terminals 412, 414, respectively with a first polarity and a second polarity, connected to the electric supply bus 404, and three output phase terminals 416, 418, 420 connected to the electric charge 408.

The electric charge 408 here is a three-phase synchronous motor with permanent magnets with smooth poles that drives a fan, not shown, in FIG. 4.

The synchronous motor 408 includes three input terminals 426, 428, 430, respectively connected across the phase output terminals 416, 418, 420.

The three-phase synchronous motor 408 includes three Hall effect sensors 436, 438, 440, electrically distributed at 120° around the rotor (not shown FIG. 4) to acquire the position of the rotor.

The inverter 406 traditionally comprises three switching arms 456, 458, 460, connected in parallel on the supply bus 404 through input terminals 412, 414, and a control unit 462 for the three switching arms 456, 458, 460.

The first switching arm 456 comprises a first switch 466 and a second switch 467, connected in series to one another at the phase terminal 416 forming a first midpoint, respectively connected to the terminal 412 with the first polarity and the terminal 414 with the second polarity of the supply bus 404, and hereinafter respectively designated by T1 and B1.

The second switching arm 458 comprises a third switch 468 and a second switch 469, connected in series to one another at the phase terminal 418 forming a second midpoint, respectively connected to the terminal 412 with the first polarity and the terminal 414 with the second polarity of the supply bus 404, and respectively hereinafter referred to as T2 and B2.

The first switching arm 460 comprises a fifth switch 470 and a second switch 471, connected in series to one another at the phase terminal 420 forming a third midpoint, respectively connected to the terminal 412 with the first polarity and the terminal 414 with the second polarity of the supply bus 404, and hereinafter respectively designated by T3 and B3.

The control unit 462 is a PWM (pulse width modulation) control unit, of the 120° type, which means that each switch is active for 120 electrical degrees. The cutoff frequency here is equal to 20 kHz.

The switches T1, B1, T2, B2, T3, B3 are controlled as a function of the pulse width modulated cyclic ratio and the position of the rotor of the synchronous motor given by the Hall effect position sensors 436, 438, 440.

Figure 5:
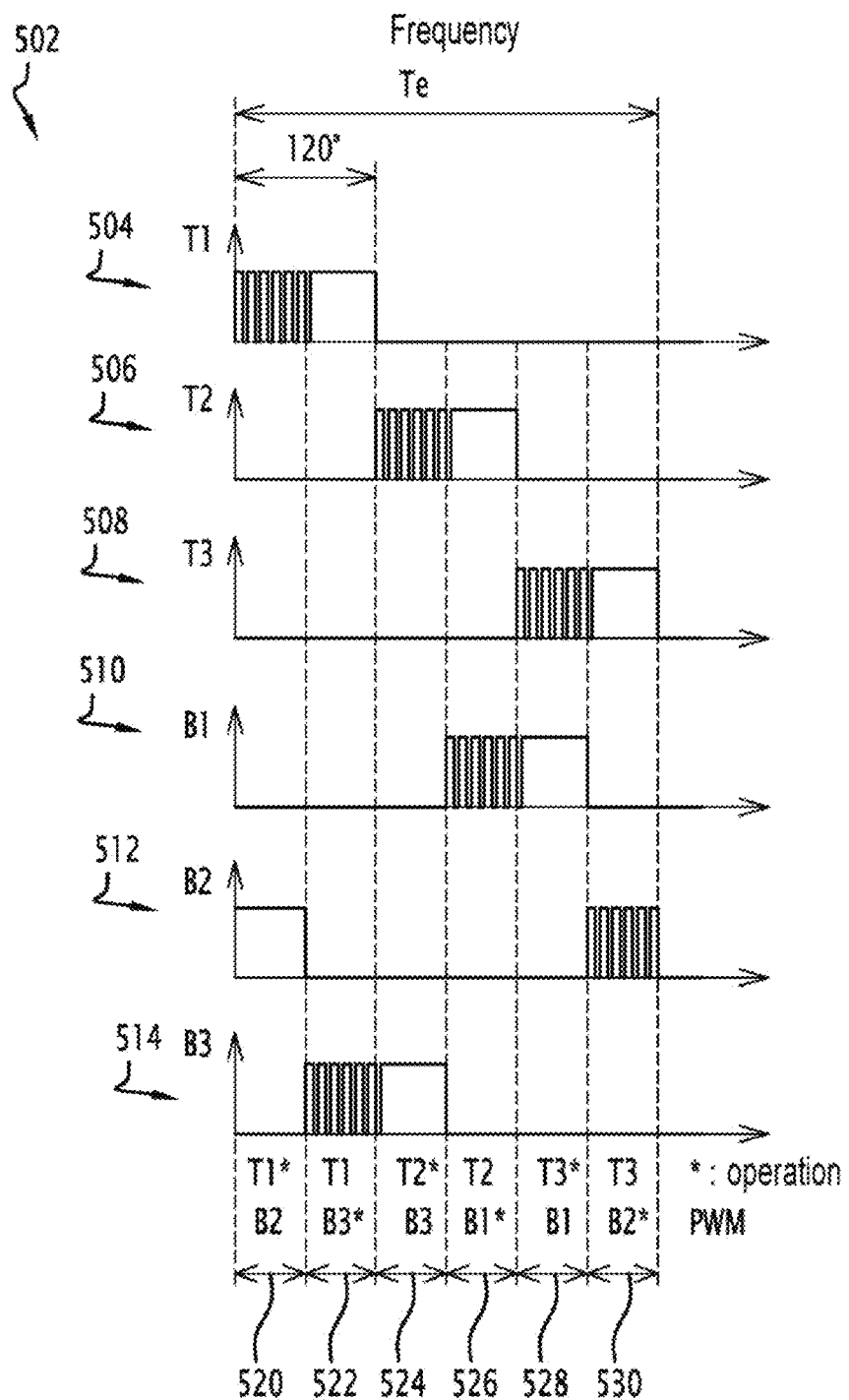
FIG. 5 is a set of six timelines describing the evolution over time of the commands of the switches of the static converter of FIG. 4, controlled in nominal operation.

The evolution over time 502 of the commands of the switches T1, B1, T2, B2, T3, B3 when the static converter drives, during nominal operation, the synchronous motor 408 is shown in FIG. 5 over a time period of rotation of the motor by six timelines 504, 506, 508, 510, 512, 514, each associated with a unique and different electronic switch T1, T2, T3, B1, B2, B3, respectively.

In a first period 520, the control of the switch T1 is a pulse width modulated train, the switch B2 is commanded to the on state, i.e., low impedance, the remaining switches T2, T2, B1, B3 being commanded to the open state, i.e., high impedance.

A series of control periods 522, 524, 526, 528, 530 may be read and respectively characterized by codes T1B3*, T2*B3, T2B1*, T3*B1, T3B2*, a code representing, in a given period, all of the switches that are not continuously commanded during the command period to the non-open state, a PWM controlled switch bearing an asterisk in the suffix and a switch commanded to the closed state throughout the entire control period not bearing an asterisk.

Here as an example, the controlled switches are switches of the IGBT (Insulated Gate Bipolar Transistor) type.

In general, a controlled electronic switch for which the invention is applicable is an electronic semiconductor element comprised in the set made up of thyristors, IGBT-type transistors (insulated gate bipolar transistor), MLS (metal oxide silicon) transistors, and GTO's (gate turnoff transistors).

Figure 6:
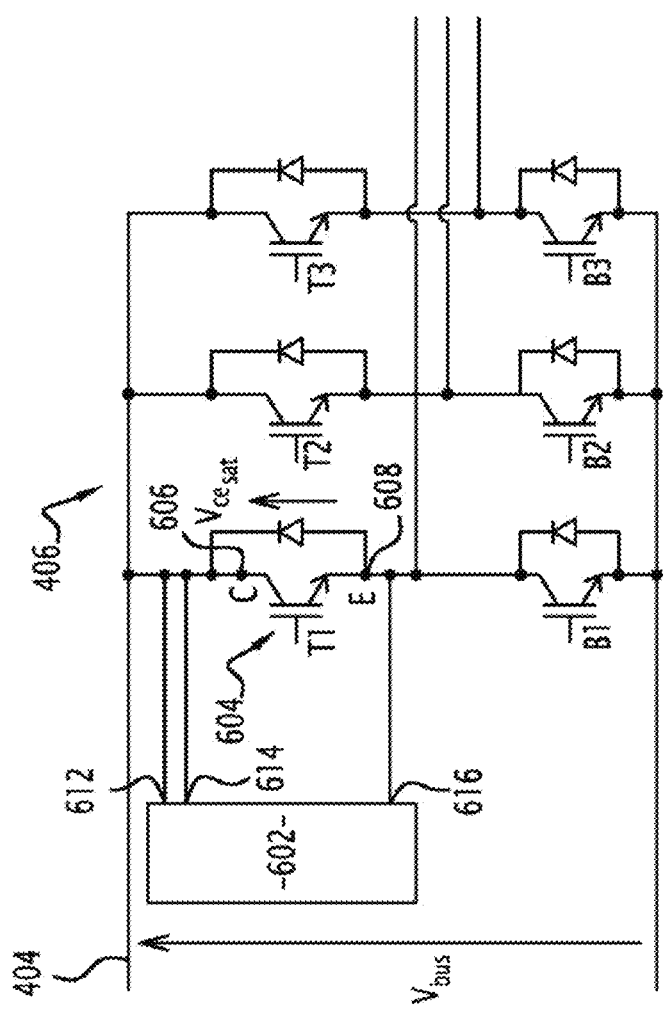
FIG. 6 is a view of the static converter of FIG. 4 describing the installation of an electronic temperature sensor as described in FIGS. 1 and 2 on an electronic switch of the static converter.

According to FIG. 6, the static converter 406 of FIG. 4 comprises an electronic temperature sensor 602 according to the invention to measure the power junction temperature of the switch T1, designated here by 604.

The electronic temperature sensor 602 is associated with itself and connected to the controlled electronic switch T1 of the static converter 406.

The semi-conductive power junction 604 of the electronic switch T1 has a low impedance when the switch is controlled into an on state and a high impedance when the switch is controlled into an on state.

The electronic switch T1 here includes an upstream terminal 606 collecting power C and a downstream terminal 608 emitting power E of said semiconductor junction 604 of the electronic switch T1 whose temperature is measured.

The first injection and output terminal of the injection source of the sensor, here designated by 612, is connected to the upstream terminal 606 collecting power C of the semiconductor junction 604.

The second first element terminal, here designated by 614, of the first series connection element of the sensor 602, is connected to the upstream terminal 606 collecting power C of the semiconductor junction 604.

The fourth second element terminal, here designated by 614, of the second series connection element of the sensor 602, is connected to the downstream terminal 608 emitting power E of the semiconductor junction 604.

Figure 7:
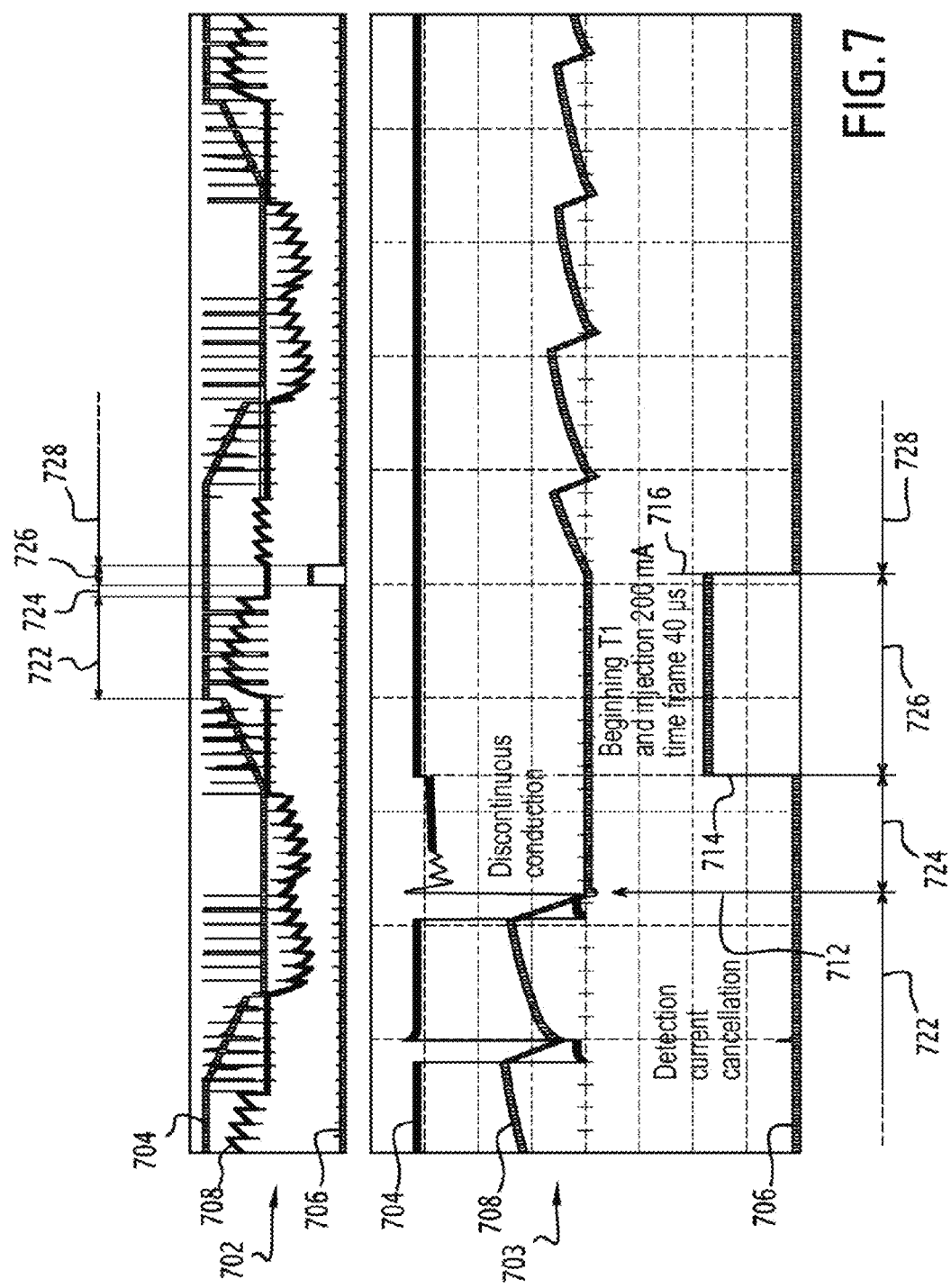
FIG. 7 is a set of a first reading and a second reading each according to three curves of the evolution over time of the PWM (Pulse Width Modulation) command of the first switch T1, the evolution of the injection current delivered by the electronic temperature sensor, the evolution of the phase current of the motor delivered at the midpoint of the switching arm corresponding to the switch T1. The first reading corresponds to a time interval encompassing a first phase preceding the electronic temperature measurement, a second phase for electronic temperature measurement of the power junction described in FIG. 6, and a third phase following the electronic temperature measurement. The second reading is a 10× magnification of the first reading centered on the second phase of the electronic temperature measurement.

According to FIG. 7, a first reading 702 and a second reading 703 of the evolution over time, before temperature measurement and during the electronic temperature measurement phase of the power junction 604 described in FIG. 6, of the PWM command of the first switch T1, the evolution of the injection interval command delivered by the electronic sensor 602, the evolution of the phase current of the motor delivered at the midpoint of the switching arm corresponding to the switch T1, respectively comprises, associated, a first curve 704, a second curve 706 and a third curve 708.

Four time phases may be distinguished on the readings 702 and 703 using a first vertical line 712, a second vertical line 714, a third vertical line 716, all three drawn in dotted lines and respectively serving as markers for moments ts1, ts2, ts3.

In a first phase 722 preceding the moment ts1, the switch T1 is commanded in PWM mode, and at the same time, the switch B2 is commanded to the closed state, the remaining switches T2, T2, B1, B3 being command to the open state. This corresponds to the first operating period 520 of the converter described in FIG. 5.

In a second phase 724, comprised between moments ts1 and ts2, all of the electronic switches T1, T2, T3, B1, B2, B3 are placed in the open state to cancel the current by the supply bus 404.

In a third phase 726, comprised between moments ts2 and ts3, all of the switches T2, T3, B1, B2, B3 remain in the open state with the exception of the switch T1 whose temperature is measured, which is controlled to the closed state from moment ts2.

In the same third phase 726, the injection source injects a calibrated low-intensity measurement current, here equal to 200 mA, in the power junction of the measured switch T1, here an IGBT transistor.

After a stabilization duration of the value of the injected calibrated measurement current beginning from ts2 (not shown in figure), the voltage VCE is measured between the upstream terminal and the downstream terminal of the junction of the switch T1 and the temperature of the junction is deduced from the measurement of the voltage Vice.

In a fourth phase 728 beginning from moment ts3, the nominal operating reading of the inverter is reestablished by leaving, for a first length of time, the switch T1 closed, by PWM-modulating the switch B3, and leaving the switches T2, T3, B1, B2 open, which corresponds to the second period described in FIG. 4, and continuing the sequence of the commands of the control unit as described in FIG. 4.

It must be noted that the injection of the current into the switch T1 must be done when the power current of that switch is null so as not to distort the measurement by a voltage drop VCE that would be greatly increased and would correspond to the flow of a current that is the sum of the injection current and the motor current.

It must also be noted that the leak current of the freewheeling diodes, even at the maximum temperature, is approximately one mA, i.e., negligible relative to the static regime injection current.

It has been shown and verified that if the measurement is done on the fixed zones of the control law, the electromotive forces of the windings of the motor are in a configuration that inversely polarizes the free-wheeling diodes and prevents the short-circuit of that motor on the one hand, the flow of leak currents inversely in the IGBT being on but with negligible values.

In principle, this operating mode does not modify the control law, since to take the measurement, it suffices to set the cyclic ratio to zero.

By extension, assuming that the six IGBT's are provided in a dedicated manner with a temperature sensor according to the invention, the six switches may be successively tested over a same electric period. The minimum time allocated to the measurement is set by the maximum speed of the inverter. When the maximum speed is for example equal to 17,000 RPM, this yields a sequence duration of 196 ms, sizing it for the production of the injection source of the measurement current.

Figure 8:
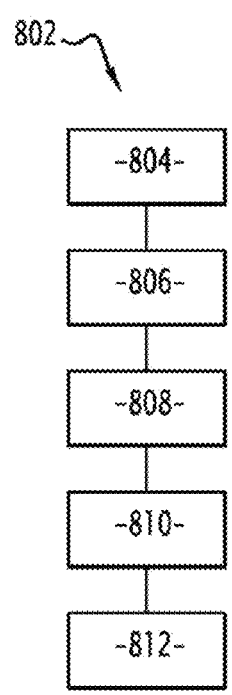
FIG. 8 is a flowchart of a general method for measuring the temperature of at least one electronic switch of a static power converter with any structure.

According to FIG. 8 and in general, a method 802 for measuring the temperature of a semi-conductive power junction of a controlled electronic switch whose temperature is tested, and integrated into a static converter, is implemented by an electronic temperature sensor, dedicated in itself and described in FIGS. 1 and 2.

The static converter in which the temperature-tested electronic switch is integrated is part of an electric power system.

In general, the electric power system comprises an electric supply bus, a static power converter supplied by the electric supply bus, and an electric charge supplied by the static converter at the output of the converter.

In general, the static converter comprises an assembly formed by an integer number of switching cells, arranged in a predetermined structure and supplied by the electric supply bus.

Each switching cell is formed by a unique and different pair of controlled electronic switches.

One of the cells comprises the controlled and temperature-tested electronic switch.

The semi-conductive power junction of the temperature-measured electronic switch has a low impedance when the switch is controlled in an on state and a high impedance when the switch is controlled in an on state.

The semi-conductive junction of the electronic switch whose temperature is measured includes an upstream terminal collecting power and a downstream emitting power.

The first injection and output terminal of the electronic sensor is connected to the power-emitting upstream terminal of the junction.

The second first element terminal of the first element of the electronic temperature sensor is connected to the power-collecting upstream terminal C of the junction.

The fourth second element terminal of the electronic temperature sensor is connected to the power-emitting downstream terminal E of the power junction.

The method 802 for measuring the temperature of the switch whose temperature is to be measured comprises a set of steps 804, 806, 808, 810 and 812.

In a first step 804, a supply voltage being applied to the static converter, the controlled switches of the converter, including the switch whose temperature will be measured, are controlled according to a first nominal operating control sequence of the static converter.

In a second following step 806 for preparing the electronic temperature measurement of the power junction of the switch to be tested, all of the electronic power switches that may cause parasitic currents to pass through the switch whose temperature is to be electronically measured and the switch whose temperature is to be electronically measured are controlled to be opened during an initialization duration. The parasitic currents are the currents of the engine in the nominal rating that must be canceled out before launching the measurement, the currents with a negligible value next remaining.

As an alternative in step 806, all of the controlled electronic switches of the static converter are controlled to be opened during an initialization duration.

The preparation step 806 follows the nominal operation step 804 during which the switch to be measured was active and reached its maximum operating temperature, and continued recently to operate.

In a following third step 808, from a first moment t1 for receiving a command to begin injection of a calibrated measurement current, the electronic switch whose temperature is to be tested is closed by a command to reestablish the conduction state of the power junction whose actual temperature is sought, and the parasitic currents generated by the possible parasitic current sources that may cross through the power junction of the tested switch are kept null or minimal, by maintaining the openness of the electronic switches during said cancellation or minimization.

In the same step 808, the command to close the switch whose temperature is to be tested having been executed, during a first predetermined duration $\Delta t1$, a calibrated measurement current with a low value, for example equal to 200 mA, is injected directly by the injection source of the semiconductor junction of the tested electronic switch placed in the closed state.

In a fourth step 810, beginning from a second moment t2 for beginning the measurement by the measurement chain, separated from the first moment t1 by a second duration $\Delta t2$ shorter than the first duration, the evolution of the voltage VCE(T) is measured across the terminals of the junction by the differential voltage amplifier for a third duration $\Delta t3$ shorter than the difference between $\Delta t1$ and $\Delta t2$.

In a fifth step 812, following the fourth step 810, the temperature $\Delta T$ of the junction is deduced from the evolution of the measured voltage $\Delta VCE(T)$ and a predetermined characteristic conversion curve between the voltage VCE and the predetermined temperature. This curve makes it possible to extract the sensitivity coefficient. The voltage evolution is defined by the difference between the measurement of VCE hot at the temperature T and the measurement of VCE at a reference temperature Tref. The evolution of the temperature is defined by the difference between the sought temperature T and the reference temperature Tref. For example, considering a constant sensitivity factor:

$$T = Tref. + (VCE(T) - VCE(Tref))/\text{heat sensitivity factor}$$

Alternatively, in the third step 808, all of the controlled electronic switches of the static converter with the exception of the switch whose temperature is measured are kept in the open state.

Alternatively, the method for measuring the temperature comprises a step for reestablishing the nominal operation of the converter by restoring the nominal control sequence of the switches of the converter synchronized with the electric response of the charge.

The invention claimed is:

1. An electronic temperature sensor for measuring the junction temperature of a controlled electronic power switch of an electronic switching cell of a static converter:
   comprising:
   an injection source of a calibrated measurement current and a differential voltage measurement amplifier,
   the injection source of a calibrated measurement current having at least one injection and output terminal and being configured to deliver a first calibrated measurement output current at a first injection and output terminal from among the at least one output terminal, the first output terminal being designed to be connected to an upstream power terminal of the junction of the electronic switch whose temperature is being measured, the differential voltage amplifier having a first differential amplifier input terminal and a second differential amplifier input terminal for a differential voltage signal, a first series connection element for protecting against a high voltage having a first element terminal connected to the first differential input terminal of the differential voltage amplifier and a second first element terminal connected to the upstream power terminal of the semiconductor junction of the electronic switch whose temperature is measured, a second series connection element protecting against a high voltage, having a third second element terminal connected to the second differential input terminal of the differential voltage amplifier, and a fourth second element terminal connected to the downstream power terminal of the semiconductor junction of the electronic switch whose temperature is being measured, the first and second series connection elements having essentially identical electrical characteristics and being comprised in the set formed by resistances and high-voltage rapid diodes.

2. The electronic temperature sensor according to claim 1, wherein the first series connection element is a first high-voltage isolating rapid diode, connected by its anode through the first terminal of a first element to the first differential input terminal of the differential voltage amplifier, the second series connection element is a second high-voltage insulating rapid diode, connected by its anode through the third second element terminal to the second differential input terminal of the differential voltage amplifier, and the injection source is configured to deliver a second calibrated correction current at a second injection and output terminal, the second injection and output terminal being connected to the downstream power terminal of the junction of the electronic switch whose temperature is being measured, and the injection source is configured to adjust the first and second rapid isolating diodes to a same current value, such that the voltage drops across the terminals of the first and second diodes are identical.

3. The electronic temperature sensor according to claim 2, wherein the first high-voltage rapid isolating diode is connected by its cathode through the second first element terminal to the first injection and output terminal while being part of the injection source to isolate and protect the injection source in high voltage.

4. The electronic temperature sensor according to claim 3, wherein the second high-voltage isolating rapid diode is connected by its cathode through the fourth second element terminal to the second injection and output terminal while being part of the injection source to isolate and protect the injection source in high voltage.

5. The electronic temperature sensor according to claim 1, including a first low-voltage clipper diode and a second low-voltage clipper diode respectively connected by a first clipper diode anode and a second clipper anode to the first differential input and the second differential input of the differential voltage amplifier to protect the differential voltage amplifier in voltage, and wherein the injection source has a single first injection and output diode to deliver the calibrated measurement current in the upstream power terminal of the junction of the electronic switch, and includes a high-voltage rapid protection diode, the protection diode being separate from the first series connection element and the second series connection element, and being connected by its cathode to the first injection and output terminal, the first series connection element and the second series connection element are two first and second electric resistances respectively connected in parallel to the first and second clipper diodes to protect the clipper diodes in current and the differential voltage amplifier, the first and second electric resistances having substantially the same resistance value.

6. The electronic temperature sensor according to claim 1, wherein the injection source includes a controlled switch for inhibiting the injection of the first calibrated measurement current to reduce the consumption of the sensor when the temperature measurement is not done.

7. A static converter comprising a set of controlled electronic switches and an electronic temperature sensor according to claim 1, the electronic sensor being associated itself with and connected to a single controlled electronic switch of the assembly, wherein the electronic switch includes a semiconductor power junction that has a low impedance when the switch is commanded in an on state and a high impedance when the switch is commanded in an on state, and the electronic switch includes an upstream power collector C terminal and a downstream power emitting E terminal of said semiconductor junction of the electronic switch whose temperature is being measured, the first injection and output terminal of the injection source is connected to the upstream power collector terminal of the junction, the second first element terminal is connected to the upstream collector C terminal of the junction, and the fourth second element terminal is connected to the downstream emitting E terminal of the junction.

8. An electric power system, comprising an electric supply bus, a static power converter, defined according to claim 7, and supplied by the electric supply bus, and an electric charge supplied by the static converter at the output of the converter, the static converter comprising a set of an integer number of distinct switching cells arranged in a predetermined structure and powered by the electric supply bus, each switching cell being formed by an associated pair of controlled electronic switches.

9. The electric system according to claim 8, wherein the electric power bus is a DC voltage current source, the static converter is a polyphase inverter with a number p of phases, connected at the input and powered by the electric supply bus, the number p of phases being greater than or equal to 2, and the electric charge supplied by and connected to the polyphase static converter being a synchronous or asynchronous motor having the same number of phases p as the static converter.

10. A method for measuring the temperature of a semiconductive junction of a controlled electronic switch using a an electronic temperature sensor defined according to claim 1, comprising the following steps:

in a first step, preparing the temperature measurement of the power junction of the tested switch, by commanding the switch to measure the temperature, in the open state in the on state, and blocking the remaining switches so as to cancel or minimize the parasitic currents generated by the possible parasitic current sources that may cross through the power junction of the temperature-tested switch placed in the on state, and to synchronize the injection of the measurement current over a particular control sequence of the switches, then in a second step, from a first moment t1 for receiving a command to begin the injection of a calibrated measurement current conditioned by the detection of the cancellation of the current having crossed through the tested switch, closing, through a command, the temperature-tested switch to reestablish the low-impedance conduction state of the power junction whose actual temperature is sought, the parasitic currents generated by the motor voltages being able to cross through the power junction of the tested switch being kept minimal or negligible, and for a first predetermined duration $\Delta t1$, injecting a calibrated measurement current via the injection source into the semiconductor junction of the electronic switch tested and placed in the closed state, and in a third step, from a second moment t2, beginning the measurement by the measurement chain, after and separated from the first moment t1 by a second duration $\Delta t2$ shorter than the first duration $\Delta t1$, measuring the evolution of the voltage VCE(T) measured across the terminals of the semiconductor junction of the switch tested by the differential voltage amplifier during a third duration $\Delta t3$ shorter than the difference between $\Delta t1$ and $\Delta t2$, then in a fourth step, following the third step, deducing the differential temperature $\Delta T$ of the junction from the evolution of the measured voltage $\Delta VCE(T)$ and a predetermined characteristic conversion curve between the voltage VCE and the predetermined temperature.

* * * * *